(12) United States Patent
Kong et al.

(10) Patent No.: US 9,166,245 B2
(45) Date of Patent: Oct. 20, 2015

(54) DISTRIBUTOR AND FUEL CELL MODULE HAVING THE SAME

(75) Inventors: Sang-Jun Kong, Yongin-si (KR);
Duk-Hyoung Yoon, Yongin-si (KR);
Kwang-Jin Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 228 days.

(21) Appl. No.: 13/555,062

(22) Filed: Jul. 20, 2012

(65) Prior Publication Data

US 2013/0137008 A1 May 30, 2013

(30) Foreign Application Priority Data

Nov. 24, 2011 (KR) .................. 10-2011-0123580

(51) Int. Cl.
*H01M 8/04* (2006.01)
*H01M 8/24* (2006.01)

(52) U.S. Cl.
CPC ........ *H01M 8/2465* (2013.01); *H01M 8/04201* (2013.01); *H01M 8/04753* (2013.01); *H01M 8/249* (2013.01); *Y02E 60/50* (2013.01)

(58) Field of Classification Search
CPC ............. H01M 8/2465; H01M 8/249; H01M 8/04753; H01M 8/04201
USPC .................................................. 429/456, 512
See application file for complete search history.

(56) References Cited

U.S. PATENT DOCUMENTS

| | | | |
|---|---|---|---|
| 3,817,689 A * | 6/1974 | Capy | 431/349 |
| 5,914,200 A * | 6/1999 | Schabert et al. | 429/415 |
| 2003/0118878 A1 * | 6/2003 | Pinto | 429/13 |
| 2009/0098428 A1 | 4/2009 | Lin et al. | |
| 2009/0280390 A1 * | 11/2009 | McLean | 429/34 |

FOREIGN PATENT DOCUMENTS

| | | |
|---|---|---|
| JP | 2009-218110 A | 9/2009 |
| KR | 10-2004-0100141 A | 12/2004 |
| KR | 10-2006-0019998 A | 3/2006 |
| KR | 10-2009-0038344 | 4/2009 |

* cited by examiner

*Primary Examiner* — Sean P Cullen
(74) *Attorney, Agent, or Firm* — Christie, Parker & Hale, LLP (57) ABSTRACT

A distributor and a fuel cell module including the distributor are disclosed. The distributor is for supplying a fuel or oxidant from a supply tube to a plurality of distribution portions. The distributor includes a buffer portion and a guide portion. The buffer portion has a center for receiving the fuel or oxidant from the supply tube, and a buffer surface extending away from the center. The guide portion defines a first space with a periphery of the buffer portion. The guide portion is radially connected to the plurality of distribution portions about a center axis of the distributor.

12 Claims, 9 Drawing Sheets

FIG. 9

DISTRIBUTOR AND FUEL CELL MODULE HAVING THE SAME

CROSS-REFERENCE TO RELATED APPLICATION

This application claims priority to and the benefit of Korean Patent Application No. 10-2011-0123580, filed on Nov. 24, 2011 in the Korean Intellectual Property Office, the entire content of which is incorporated herein by reference

BACKGROUND

1. Field

The following description relates to a distributor and a fuel cell module having the same.

2. Description of Related Art

A fuel cell may be classified into several types depending on the type of electrolyte used. Because of the variety of output ranges and usages among the different fuel cell types, the appropriate fuel cell may be selected based on its intended purpose.

Among the different fuel cell types, the solid oxide fuel cell functions well as a distributed power generator in both a commercial and a residential setting. In a solid oxide fuel cell, control of the electrolyte position is easy. In addition, the position of the electrolyte is fixed and thus, there is little or no risk of electrolyte depletion. Further, the strong anti-corrosiveness of the electrolyte provides for a long lifetime of the material.

The voltage or capacity of a single unit cell in the fuel cell is typically not high enough for the actual usage needed. Accordingly, a fuel cell stack having a specific voltage and a specific capacity is designed by connecting a plurality of unit cell in series or in parallel to implement the necessary real life voltage or capacity.

Further, a fuel cell module is used to connect a plurality of fuel cell stacks in a high-capacity configuration. The design of an efficient distributor capable of using space efficiently while uniformly distributing fuel or oxidant to each stack becomes an important issue in terms of efficiency of the entire fuel cell system.

SUMMARY

An aspect of an embodiment of the present invention is directed toward a distributor for uniformly supplying a fuel and an oxidant to a plurality of fuel cell stacks.

In an exemplary embodiment according to the present invention, a distributor for supplying a fuel or oxidant from a supply tube to a plurality of plurality of distribution portions is provided. The distributor includes: a buffer portion having a center for receiving the fuel or oxidant from the supply tube, and a buffer surface extending away from the center; and a guide portion defining a first space with a periphery of the buffer portion. The guide portion is radially connected to the plurality of distribution portions about a center axis of the distributor.

The buffer surface may be inclined with respect to the center axis to define a second space with the buffer portion.

Adjacent ones of the plurality of distribution portions may define uniform angles with respect to the center axis.

The center may be at a lower end of the buffer portion.

The distributor may further include an upper cover for sealing an upper portion of the guide portion.

A diameter of the upper cover may be smaller than a diameter of the guide portion and larger than a diameter of the buffer portion.

The upper cover may be configured to connect to the supply tube.

In another exemplary embodiment according to the present invention, a distributor for supplying a fuel or oxidant from a supply tube to a plurality of distribution portions is provided. The distributor includes: a buffer portion forming an internal space surrounded by a partition, the internal space for receiving the fuel or oxidant from the supply tube; and a guide portion defining an external space with a periphery of the buffer portion. The guide portion is radially connected to the plurality of distribution portions about a center axis of the distributor.

The supply tube may be configured to extend past a lower end of the buffer portion.

Adjacent ones of the plurality of distribution portions may define uniform angles with respect to the center axis.

The guide portion may have a cylindrical shape.

The distributor may further include an upper cover for sealing an upper portion of the guide portion.

A diameter of the upper cover may be smaller than a diameter of the guide portion and larger than a diameter of the buffer portion.

The upper cover may be configured to connect to the supply tube.

The supply tube may be configured to extend into the internal space.

The upper cover may taper to a smaller diameter than the buffer portion.

In still another exemplary embodiment of the present invention, a fuel cell module is provided. The fuel cell module includes: a plurality of fuel cell stacks connected to a corresponding plurality of distribution portions, each of the distribution portions for distributing a fuel or oxidant to a respective one of the fuel cell stacks; a supply tube for supplying the fuel or oxidant; and a distributor as in one of the above-mentioned embodiments. The distributor is connected to the supply tube and to the distribution portions. The distributor is for receiving the fuel or oxidant through the supply tube and for distributing the fuel or oxidant to the fuel cell stacks through the distribution portions.

Each of the distribution portions may have a same length.

In still yet another exemplary embodiment of the present invention, a two-stage fuel cell module is provided. The two-stage fuel cell module includes a plurality of first fuel cell modules connected to a corresponding plurality of first distribution portions, a first supply tube for supplying a fuel or oxidant, and a first distributor as in one of the above-mentioned embodiments. The first distributor is for receiving the fuel or oxidant through the first supply tube and for distributing the fuel or oxidant to the first fuel cell modules through the first distribution portions. Each of the first distribution portions is for supplying the fuel or oxidant to a respective one of the first fuel cell modules. Each of the first fuel cell modules includes: a plurality of fuel cell stacks connected to a corresponding plurality of second distribution portions, each of the second distribution portions for distributing the fuel or oxidant to a respective one of the fuel cell stacks; and a second distributor connected to a respective one of the first distribution portions and to the second distribution portions. The second distributor is for receiving the fuel or oxidant through the respective one of the first distribution portions and for distributing the fuel or oxidant to the fuel cell stacks through the second distribution portions.

According to an embodiment of the present invention, a flow of the fuel or oxidant through a buffer portion of a distributor causes the flow to slow down or stop for a while and possibly accumulate in the buffer portion before the flow is supplied in a more balanced fashion to each of the fuel cell stacks. In addition, by providing the distributor including the buffer portion as two or more stages, there is an added accumulation and balancing effect in the buffer portion that can supply the fuel or oxidant having a more uniform flow rate to each of the fuel cell stacks even when a large flow of fuel or oxidant is supplied.

BRIEF DESCRIPTION OF THE DRAWINGS

The accompanying drawings, together with the specification, illustrate exemplary embodiments of the present invention, and, together with the description, serve to explain aspects and principles of the present invention.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or be indirectly on another element with one or more intervening elements interposed therebetween. In addition, when an element is referred to as being "connected to" another element, it can be directly connected to another element or be indirectly connected to another element with one or more intervening elements interposed therebetween. Hereinafter, like reference numerals refer to like elements.

A fuel cell may include a fuel converter (for example, a reformer or a reactor) and a fuel cell module for reforming and supplying a fuel. Herein, a fuel cell module refers to an assembly including a fuel cell stack for converting chemical energy into electric energy and thermal energy by an electrochemical method. That is, a fuel cell module may include a fuel cell stack; a plumbing system in which fuel, oxides, cooling water, exhaust, and the like move; wiring that routes electricity generated by the stack; a part for controlling or monitoring the stack; and a part for resolving anomalies.

Aspects of embodiments of the present invention relate to a distributor for supplying fuel or oxidant to a plurality of fuel cell stacks, and a fuel cell module including the distributor. Exemplary embodiments of the present invention will be described in detail. First, however, a comparable distribution portion will described with reference to FIG. 1.

Figure 1:
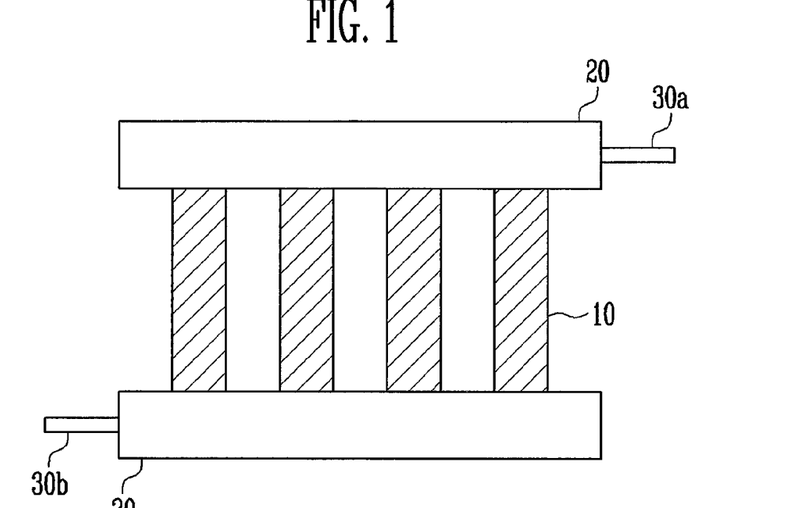
FIG. 1 is a schematic view showing a configuration of a comparable distribution portion for supplying a fuel and/or an oxidant to the fuel cell stacks.

FIG. 1 is a schematic view showing a configuration of the distribution portion for supplying a fuel and/or an oxidant to the fuel cell stacks.

In the distribution portion of FIG. 1, a one-dimensional fuel or oxidant distribution portion 20 is provided at an upper end and at a lower end of a plurality of fuel electrode stacks (fuel cell stacks) 10 and supplies a fuel and an oxidant through supply pipes 30a and 30b, respectively. In this case, a distance from the supply pipes 30a and 30b to each fuel cell stack 10 is different and thus, a flow rate of fuel or oxidant to each of the fuel cell stacks 10 is different, so that a uniform supply of fuel and oxidant to each fuel cell stack 10 is not achieved.

Embodiments of the distributor will now be described with reference to FIG. 2A to FIG. 2C.

Figure 2A:
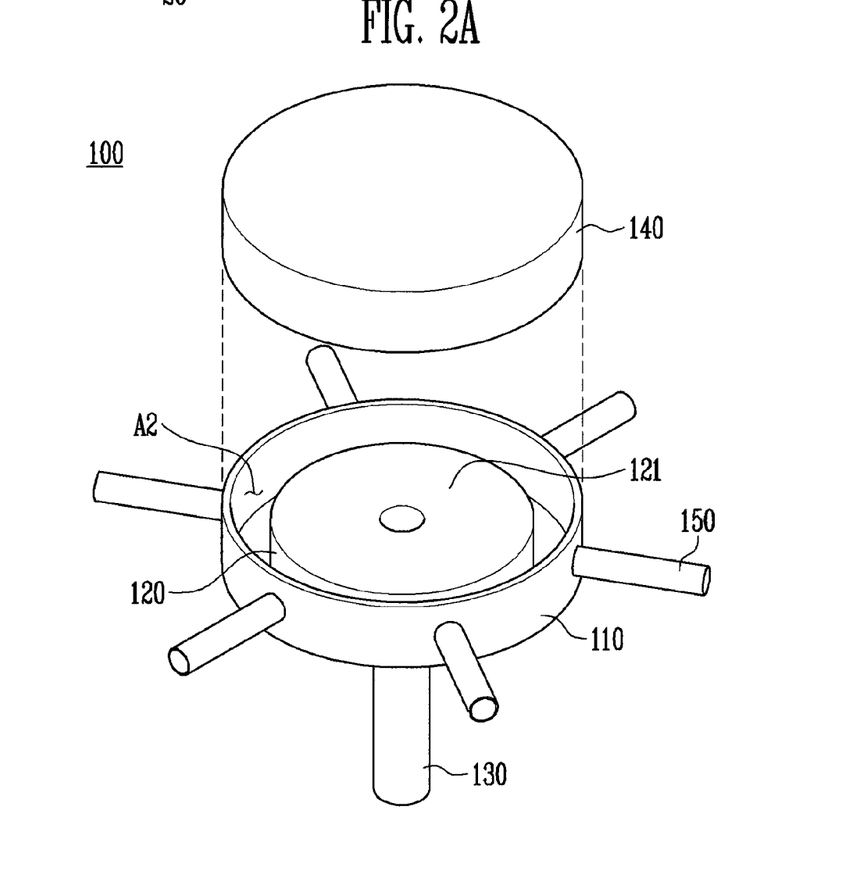
FIG. 2A shows a distributor according to an embodiment.

FIG. 2A shows a distributor 100 according to an embodiment. FIG. 2B is a longitudinal cross-section of the distributor 100 of FIG. 2A. FIG. 2C is a longitudinal cross-section showing a distributor 100a according to another embodiment.

Unless otherwise specified, it is assumed that the distributor embodiments described in this disclosure may be used to supply either fuel or oxidant. Accordingly, for convenience of description, it is assumed that each of the described distributors supplies fuel, but distributors of the same configuration can also be used to provide the oxidant. Further, the described distributor embodiments share many of the same or substantially similar elements, which are labeled with the same reference numbers throughout. Accordingly, description of these shared elements will not be repeated between different embodiments.

Figure 2B:
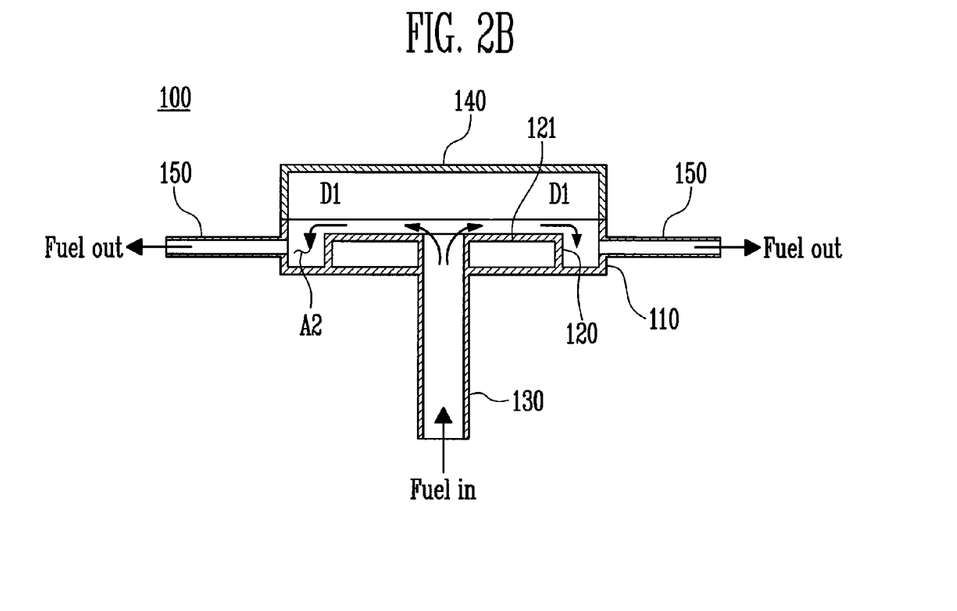
FIG. 2B is a longitudinal cross-section of the distributor of FIG. 2A.

Referring to the distributor 100 of FIGS. 2A-2B, a buffer portion 120 is located at a center portion of the distributor and a buffer surface 121 having a disc shape is formed at an upper part of the buffer portion. A supply tube 130 to which the fuel is supplied from a separate fuel supply is connected to a center of the buffer surface 121, the buffer surface 121 extending away from the supply tube 130. A guide portion 110 is formed outside of the buffer portion 120. A symmetrically shaped space A2 is formed outside of the buffer portion 120 (that is, an external space to the buffer portion 120) between the guide portion 110 and the buffer portion 120. In the embodiment of FIGS. 2A-2B, the guide portion 110 is formed in a cylinder shape.

The distributor 100 is configured to be in fluid communication with a plurality of fuel cell stacks via a corresponding plurality of distribution portions 150 located at an outer peripheral surface of the guide portion 110. The plurality of distribution portions 150 are arranged symmetrically about a center axis of the buffer portion 120 and the guide portion 110, extending radially from the guide portion 110 with respect to the center axis. Accordingly, adjacent distribution portions 150 form equal or uniform angles with respect to the center axis in order to provide a uniform supply of fuel to each of the distribution portions 150.

As can be seen in FIG. 2A, an upper part of the guide portion 110 is open. To this end, an outer upper portion of the guide portion 110 is provided with an upper cover 140 for sealing an upper portion of the guide portion 110. In addition, a side surface of the upper cover 140 is provided with sufficient height to combine with the guide portion 110 and thereby maintain a space having a separation (for example, a predetermined separation) between a top surface of the upper cover and the buffer surface 121.

As the fuel is supplied to the distributor 100 through the supply tube 130, it first starts to flow along the buffer surface 121 to the outside. The fuel then flows in an outer direction D1 of the buffer surface 121 to the guide portion 110, where it accumulates in the space A2 between the buffer portion 120 and the guide portion 110 before reaching the distribution portions 150. This accumulation in the space A2 allows the fuel to more uniformly reach the distribution portions 150. This is to be distinguished with other distributors, where the fuel is directly supplied to a plurality of distribution portions, each of which is a different distance from the fuel supply, so that a uniform flow rate of fuel cannot be provided to the different distribution portions. By contrast, in the embodiment of FIGS. 2A-2B, since each of the distribution portions 150 is located at a same distance from the supply tube 130, the fuel can be distributed and supplied at a more uniform flow rate to each of the distribution portions 150.

Figure 2C:
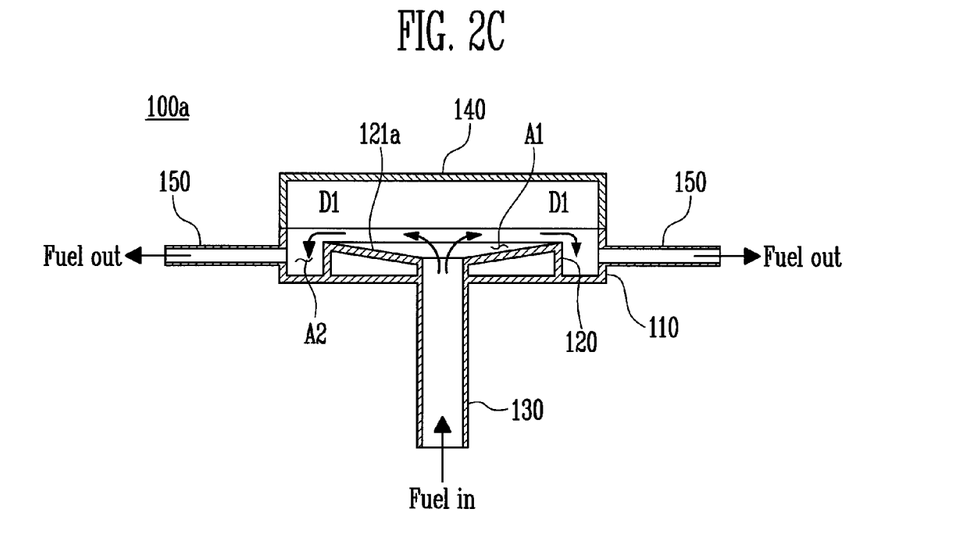
FIG. 2C is a longitudinal cross-section showing a distributor according to another embodiment.

The distributor 100a shown in FIG. 2C is substantially similar to the distributor 100 of FIGS. 2A-2B, other than the design of the buffer surface. In the distributor 100a of FIG. 2c, a buffer surface 121a is formed having an inclined surface with an ascent. In this case, the fuel supplied through the supply tube 130 moves more gradually along the buffer surface 121a to the space A2 between the buffer portion 120 and the guide portion 110 (in the direction D1) when compared to the flat surface of the buffer surface 121 of the distributor 100. This is due to added space A1 above the buffer surface 121a of the distributor 100a, which results in additional accumulation of fuel (in the space A1) compared to the distributor 100. Accordingly, the buffer surface 121a of the distributor 100a provides a more uniform supply of fuel to the different parts of the guide portion 110 (and, by extension, to each of the distribution portions 150) when compared to the buffer surface 121 of the distributor 100.

Figure 3A:
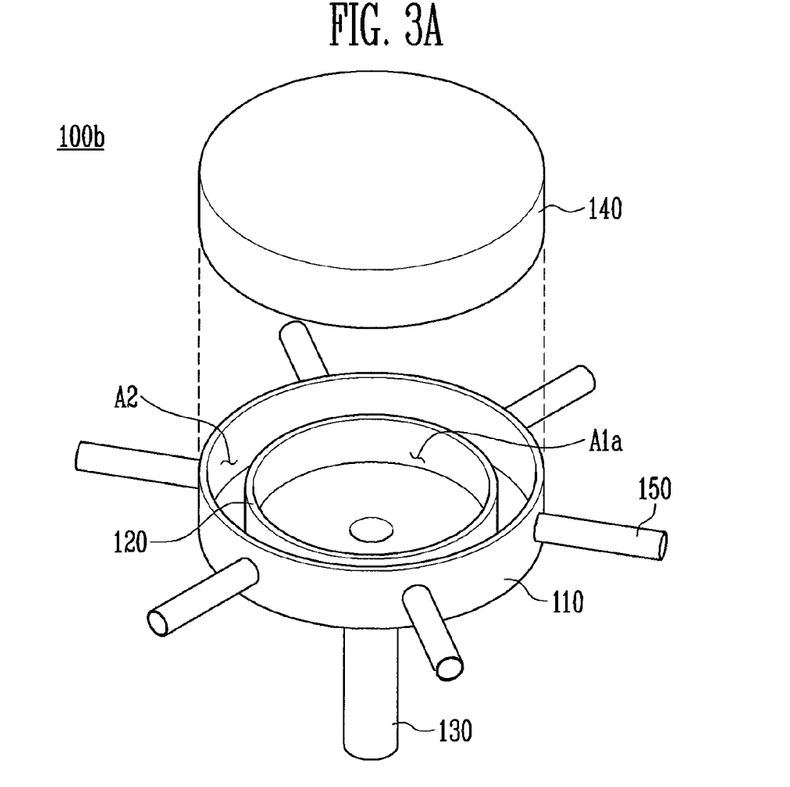
FIG. 3A is a disassembled perspective view showing a distributor according to another embodiment.
Figure 3B:
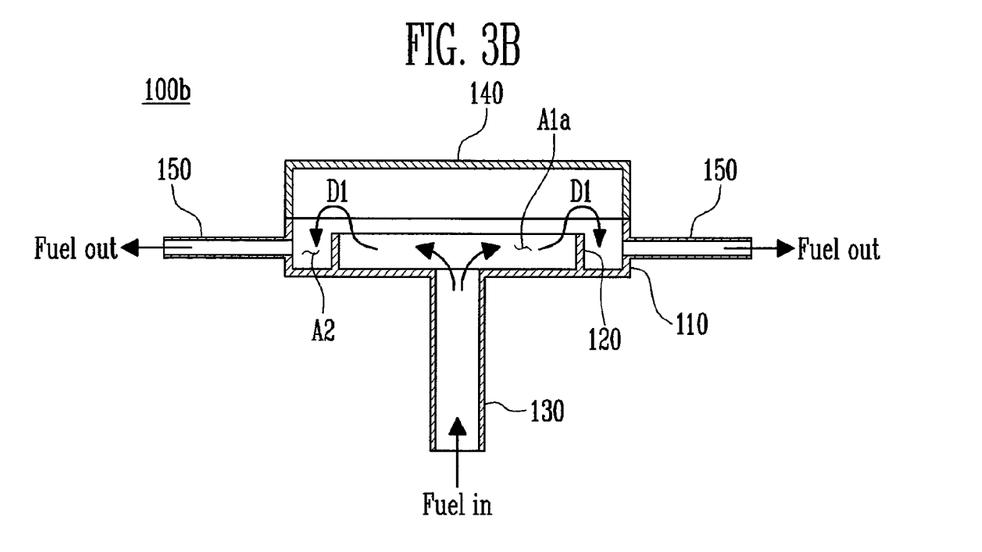
FIG. 3B and FIG. 3C are example longitudinal cross-sections of the distributor of FIG. 3A.
Figure 3C:
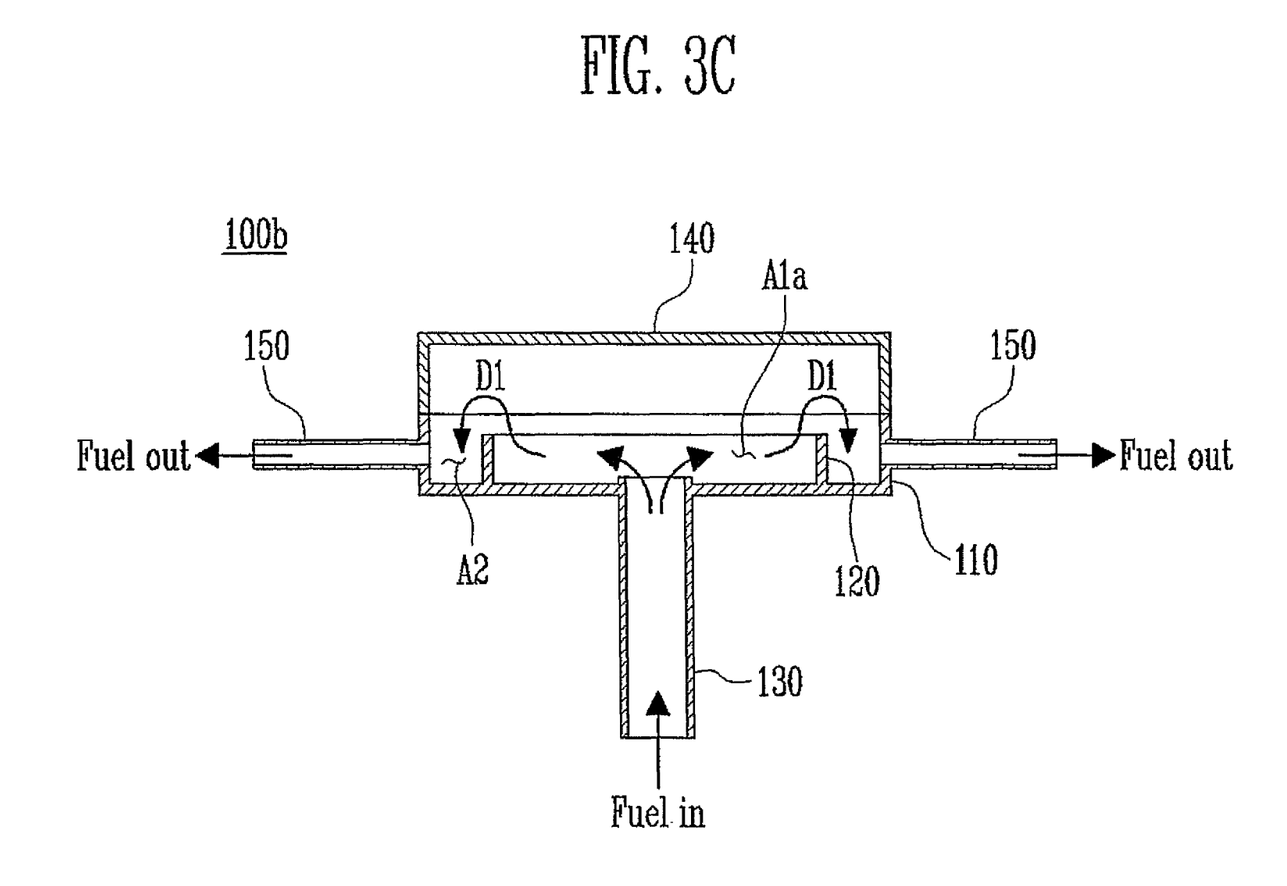

Another embodiment of a distributor 100b will be described now with reference to FIGS. 3A, 3B, and 3C. FIG. 3A is a disassembled perspective view of the distributor 100b. FIG. 3B and FIG. 3C are example longitudinal cross-sections of the distributor 100b of FIG. 3A.

In the distributor 100b, the buffer portion 120 lacks a buffer surface (when compared to the distributors 100 and 100a of FIGS. 2A-2C), thus forming an internal space A1a surrounded by a partition (e.g., the buffer portion 120 forming the internal space A1a defined by a bottom, an open top, and a solid side as illustrated in FIGS. 3B-3C, the bottom having a central portion for receiving the flow of fuel from the supply tube 130), with the supply tube 130 connected to a center of a lower portion of this internal space A1a (for example, a bottom of the buffer portion 120 as illustrated in FIG. 3B or extending past a lower end of the buffer portion 120 as illustrated in FIG. 3C). Accordingly, the distributor 100b is different from the distributors 100 and 100a in that there is no buffer surface and the internal space A1a is formed.

That is, the distributor 100b maximizes a buffering effect of the internal space A1a formed within the partition of the buffer portion 120 by removing the buffer surface (e.g., the buffer surface 121 and the buffer surface 121a of the distributors 100 and 100a, respectively). This results in still further accumulation of fuel (in the internal space A1a) compared to the distributors 100 and 100a. Thus, the fuel supplied through the supply tube 130 of the distributor 100b stays longer in the internal space A1a of the buffer portion 120 before moving to the space A2 between the buffer portion 120 and the guide section 110 (in the direction D1), thereby providing a more stable and balanced fluid flow to each of the distribution portions 150.

Further embodiments of the distributor will now be described with reference to FIGS. 4A to 4C.

Figure 4A:
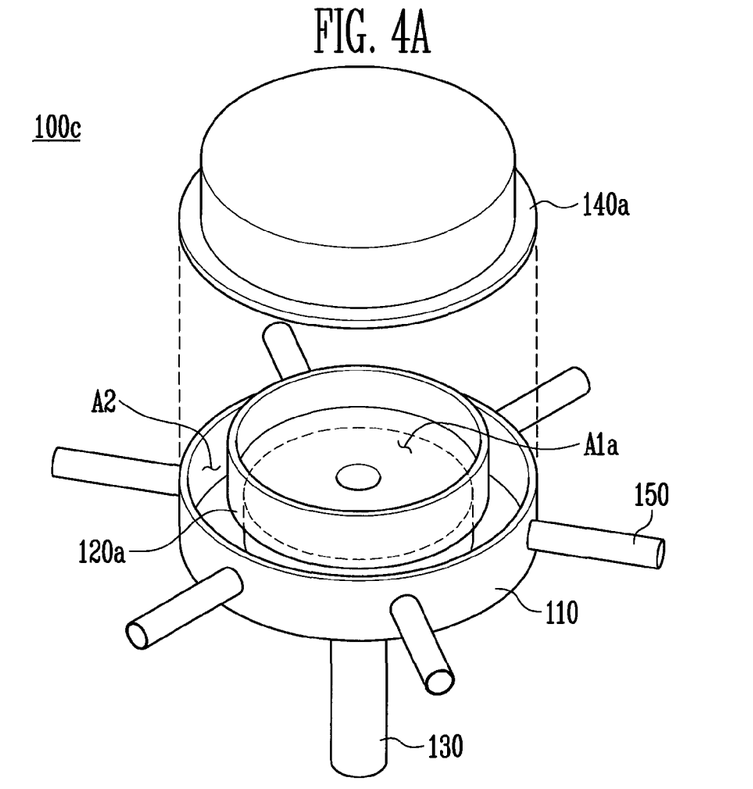
FIG. 4A is a disassembled perspective view showing a distributor according to another embodiment.
Figure 4B:
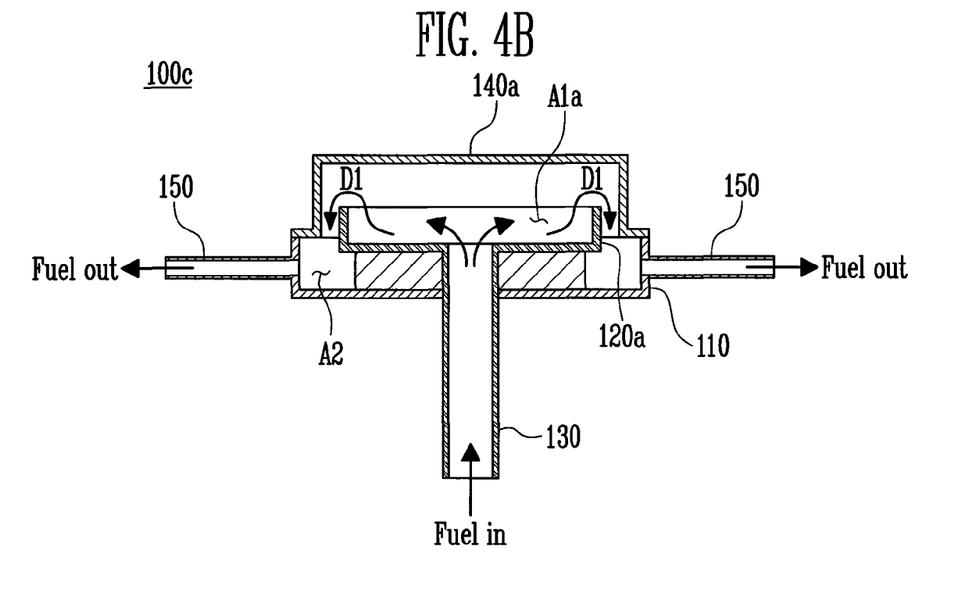
FIG. 4B is a longitudinal cross-section of the distributor of FIG. 4A.

FIG. 4A is a disassembled perspective view showing a distributor 100c according to another embodiment. FIG. 4B is a longitudinal cross-section of the distributor 100c of FIG. 4A. FIG. 4C is a longitudinal cross-section showing a distributor 100d according to another embodiment.

The distributor 100c is characterized by a diameter of an upper cover 140a and a height of a buffer portion 120a. In the distributor 100c, the diameter of the upper cover 140a is formed to be smaller than the guide portion 110 and is formed to be larger than a diameter of the buffer portion 120a. Referring to FIG. 4B, when the fuel passes and moves (in the direction D1 from the internal space A1a of the buffer portion 120a to the guide portion 110) to an exterior of the buffer portion 120a, the fuel flow is more stably maintained by passing through a narrow passage between the upper cover 140a and the buffer portion 120a.

Figure 4C:
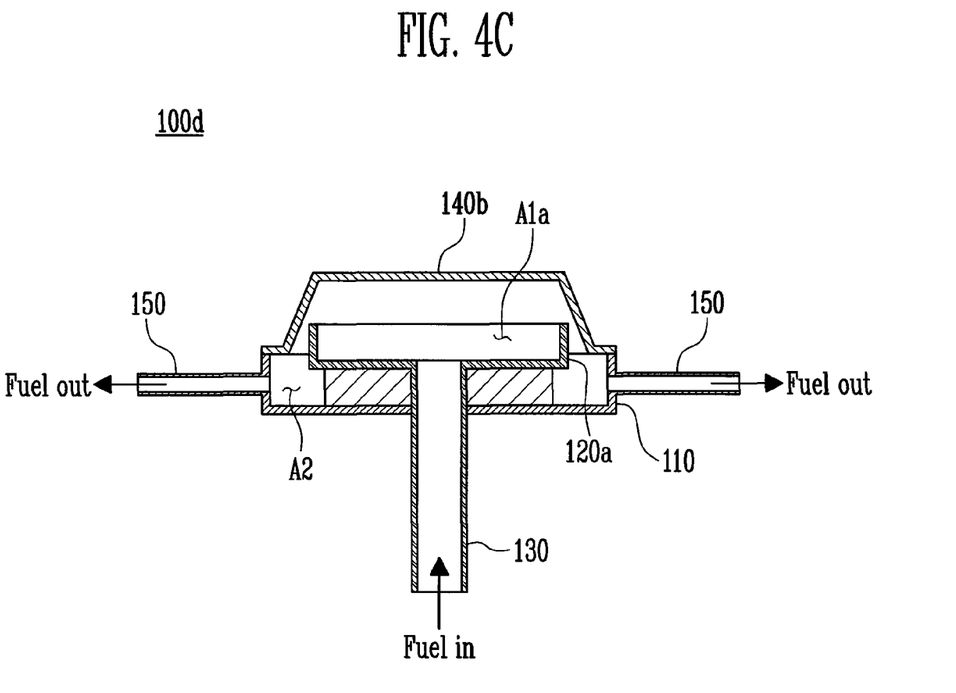
FIG. 4C is a longitudinal cross-section showing a distributor according to another embodiment.

In addition, as shown in the distributor 100d of FIG. 4C, an upper cover 140b with a tapered side surface (for example, a side surface tapering to a diameter smaller than that of the buffer portion 120a) in order to increase or maximize this narrowing effect, it is possible to decrease the diameter of the upper cover 140b near the buffer portion 120a. In this case, by further restricting the flow of the fuel through the narrow passage, it is possible to more uniformly direct the flow of the fuel from the internal space A1a of the buffer portion 120a to the space A2 between the buffer portion 120a and the guide portion 110.

Figure 5A:
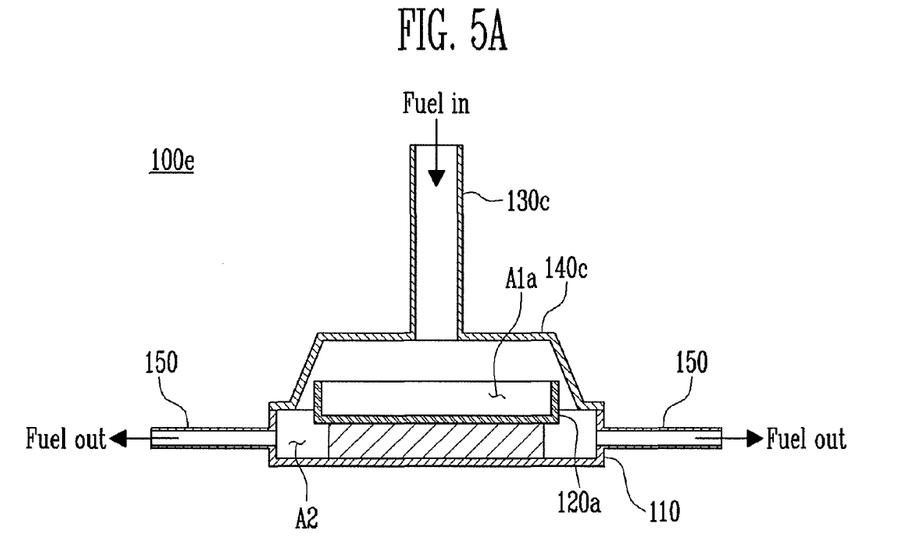
FIG. 5A and FIG. 5B are longitudinal cross sections showing distributors according to other embodiments.
Figure 5B:
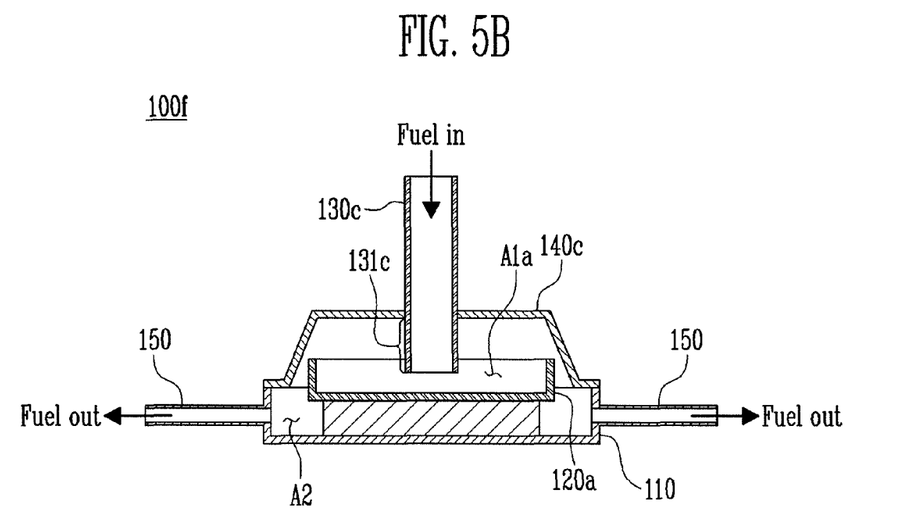

Distributors 100e and 100f according to other embodiments will now be described with reference to FIG. 5A and FIG. 5B, respectively. FIG. 5A and FIG. 5B are longitudinal cross sections showing the distributors 100e and 100f.

The distributor 100e of FIG. 5A is characterized by a location of a supply tube 130c. That is, the supply tube 130c is connected to a center of an upper portion of an upper cover 140c. Such a configuration is an effective type if the location of the supply tube 130c or the fuel supply is at an upper portion of the distributor 100e. The fuel supplied through the supply tube 130c accumulates in the internal space A1a of the buffer portion 120a that is located at a lower portion of the upper cover 140c. The flow of the fuel from here on in the distributor 100e is otherwise identical or substantially similar to the above-described embodiments.

In the distributor 100f of FIG. 5B, in order to make the flow of the fuel supplied into the buffer portion 120a more stable, a supply tube extension 131c is provided. The supply tube extension 131c extends from a lower end of the supply tube 130c to the internal space A1a of the buffer portion 120a. In this case, the fuel reaches the internal space A1a of the buffer portion 120a by flowing through the supply tube extension 131c directly to the internal space A1a so that the fuel flow remains more stable.

Figure 6:
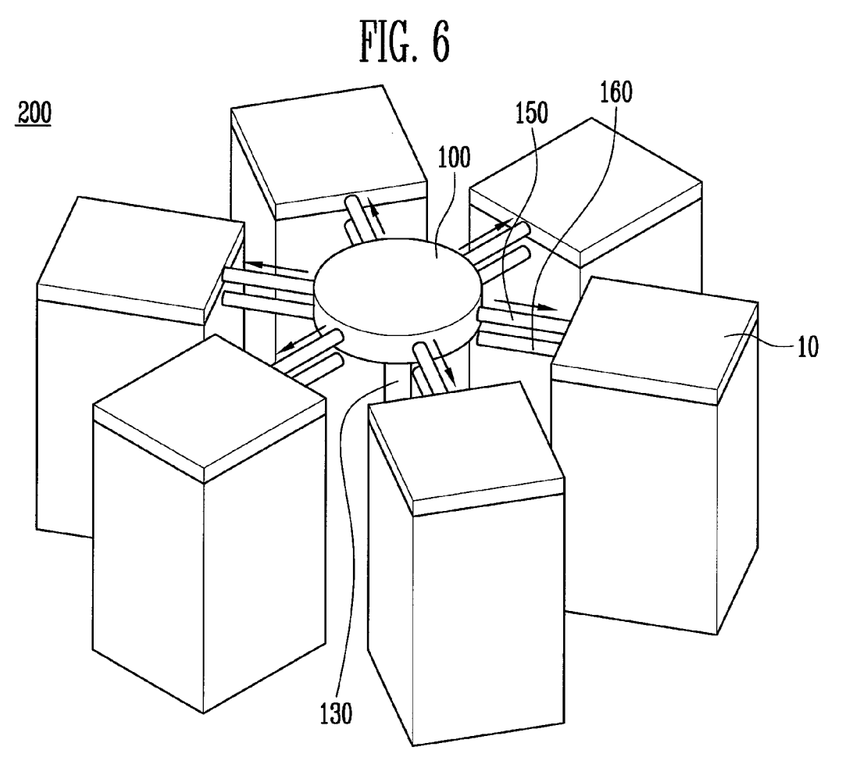
FIG. 6 is a schematic view showing a fuel cell module according to an embodiment.

A fuel cell module 200 according to an embodiment will be described with reference to FIG. 6. FIG. 6 is a schematic view of the fuel cell module 200.

The fuel supplied from a fuel supply through the supply tube 130 or oxidant supplied from an oxidant supply is provided to the fuel cell module 200. The distributor 100 having the configuration described above then supplies the fuel or oxidant through the distributor 100 to each fuel cell stack 10 through a distribution portion 150. The fuel and oxidant react through an electrochemical method in the fuel cell stack 10 and the resulting byproducts (e.g., water, discharged and unreacted fuel) are discharged through a discharge tube 160 to the outside of the fuel cell stack 10, where they can be collected and recycled. Since the discharged and unreacted fuel (AOG, anode off-gas) contains large amounts of hydrogen, it is recycled by returning to the fuel cell stack or a reformer.

To better balance the fuel and oxidant flow to each of the fuel cell stacks 10 in the fuel cell module 200, the stacks 10 are located at the same distance from the distributor 100. This allows the length of the distribution portions 150 to be equivalent. When the length of the distribution portions becomes equal, a resulting flow rate of fuel or oxidant to each fuel cell stack 10 becomes uniform.

Figure 7:
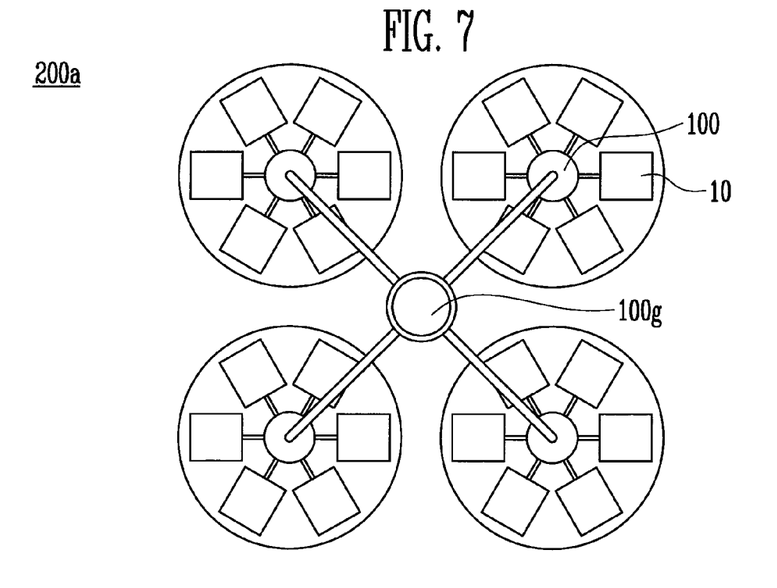
FIG. 7 to FIG. 9 are schematic views showing fuel cell modules according to other embodiments.

Fuel cell modules 200a, 200b, and 200c according to other embodiments will now be described with reference to FIG. 7, FIG. 8, and FIG. 9, respectively. FIG. 7 is a schematic view showing the fuel cell module 200a.

In the fuel cell module 200a of FIG. 7, the distributor 100 includes two stages. Accordingly, the fuel cell module 200a is characterized in that the fuel or oxidant is distributed over two different distributors to reach each of the fuel cell stacks. In the fuel cell module 200a, the fuel or oxidant is initially supplied to an initial distributor 100g located in a center of the fuel cell module 200a. From the initial distributor 100g, the fuel or oxidant is distributed and supplied to four final distributors 100 symmetrically arranged around the initial distributor 100g. From the final distributors 100, the fuel or oxidant is distributed and supplied to each fuel cell stack 10.

Figure 8:
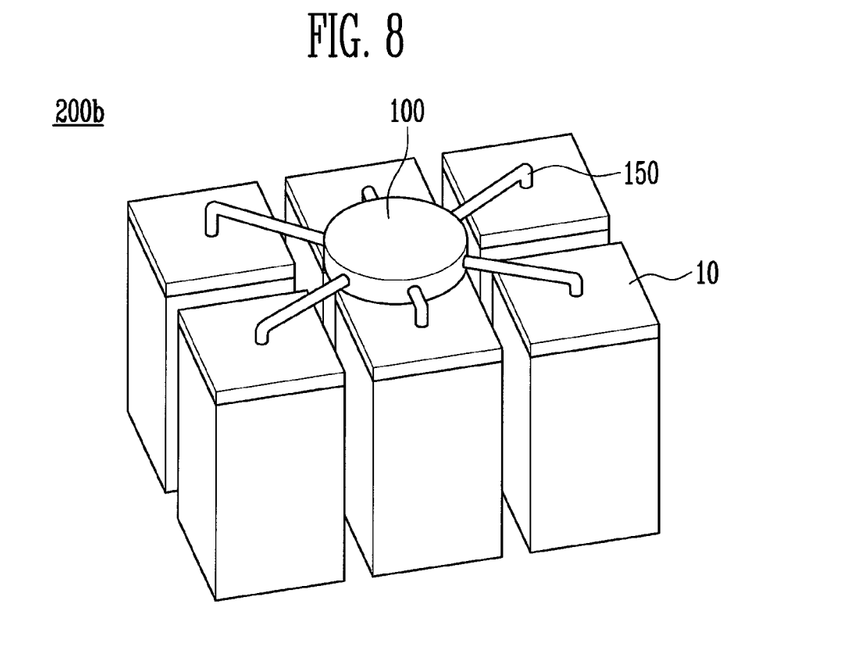

In the fuel cell module 200b of FIG. 8, six fuel cell stacks 10 are lined up in two rows of three stacks 10 apiece, one distributor 100 is provided in a central portion of the fuel cell module 200b, and distribution portions 150 connect to each of the six stacks 10 from the distributor 100.

Figure 9:
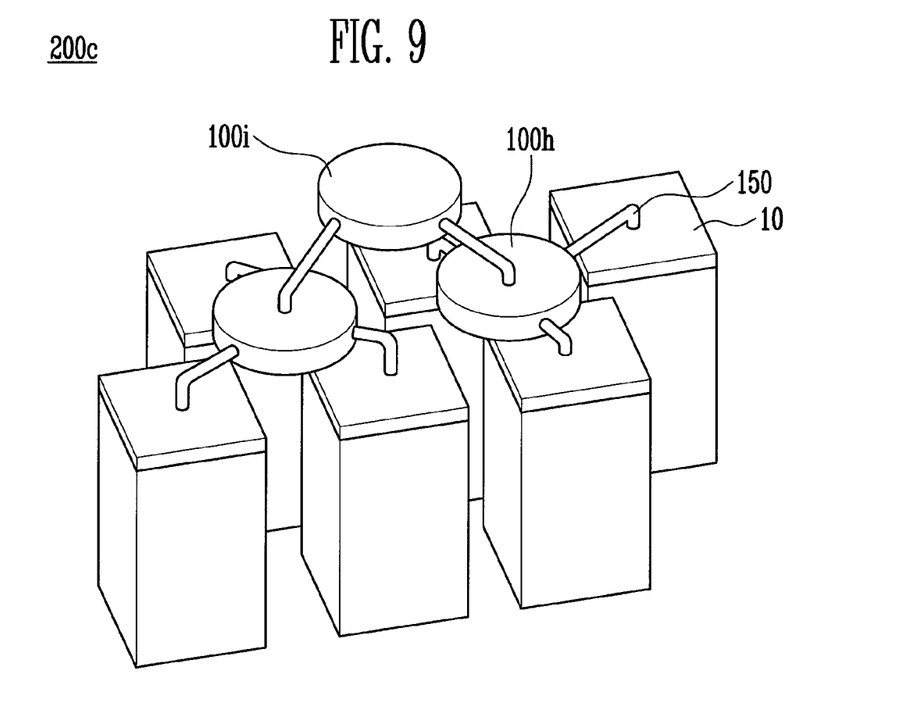

In the fuel cell module 200c of FIG. 9, six fuel cell stacks 10 are arranged in two rows of three stacks 10 apiece, wherein the two rows are offset (for example, by half a fuel cell stack 10 in the row direction) with respect to each other. In addition, the fuel cell module 200c has a two-stage distributor configuration, with final distributors 100h being provided for each of two groups of three stacks 10, and an initial distributor 100i being provided to supply fuel or oxidant to each of the two final distributors 100h.

Further, distribution portions 150 are connected to each of the corresponding three stacks 10 from the respective final distributor 100h. In addition, the two distribution portions 150 for distributing the fuel or oxidant to the final distributors 100h from the initial distributor 100i may be provided at the upper portion of the two final distributors 100h. Each of the final distributors 100h thus combines with their respective fuel cell stacks 10 and distribution portions 150 to form fuel cell modules (having three fuel cell stacks 10) that are combined with the initial distributor 100i to form the fuel cell module 200c (having six fuel cell stacks 10).

In a typical flow of fuel or oxidant in a fuel cell module, a flow variation between different distribution pipes is known to be about 30% to 60%, but in the fuel cell modules shown in FIGS. 6 to 9 described above, the flow variation between different distribution portions was measured at 0% to 7%.

While the present invention has been described in connection with certain exemplary embodiments, it is to be understood that the present invention is not limited to the disclosed embodiments, but, on the contrary, is intended to cover various modifications and equivalent arrangements included within the spirit and scope of the appended claims, and equivalents thereof.

What is claimed is:

1. A fuel distributor for supplying a flow of fuel from a supply tube to a plurality of distribution portions, the fuel distributor comprising:
    a buffer portion forming an internal space defined by a bottom, an open top, and a solid side, the bottom having a central portion for receiving the flow of fuel from the supply tube, the bottom and side of the internal space for receiving, accumulating, and directing the flow of fuel from the supply tube through the internal space and over the solid side; and
    a guide portion defining an external space with a periphery of the buffer portion, the guide portion being radially connected to the plurality of distribution portions about a center axis of the fuel distributor, the external space for receiving, accumulating, and directing the flow of fuel from over the solid side to the distribution portions, each of the distribution portions for distributing the flow of fuel to a respective one of a corresponding plurality of fuel cell stacks or fuel cell modules.

2. The fuel distributor of claim 1, wherein the supply tube is configured to extend past a lower end of the buffer portion.

3. The fuel distributor of claim 1, wherein adjacent ones of the plurality of distribution portions define uniform angles with respect to the center axis.

4. The fuel distributor of claim 1, wherein the guide portion has a cylindrical shape.

5. The fuel distributor of claim 1, further comprising an upper cover for sealing an upper portion of the guide portion.

6. The fuel distributor of claim 5, wherein a diameter of the upper cover is smaller than a diameter of the guide portion and is larger than a diameter of the buffer portion.

7. The fuel distributor of claim 5, wherein the upper cover tapers to a smaller diameter than the buffer portion.

8. The fuel distributor of claim 5, wherein the upper cover is configured to connect to the supply tube.

9. The fuel distributor of claim 8, wherein the supply tube is configured to extend into the internal space.

10. A two-stage fuel cell module comprising:
    a plurality of fuel cell modules connected to a corresponding plurality of distribution portions, each of the distribution portions for supplying a flow of fuel to a respective one of the fuel cell modules, each of the fuel cell modules comprising:
        a plurality of fuel cell stacks connected to a corresponding plurality of second distribution portions, each of the second distribution portions for distributing the flow of fuel to a respective one of the fuel cell stacks; and
        a second fuel distributor connected to a respective one of the distribution portions and to the second distribution portions, the second fuel distributor being for receiving the flow of fuel through the respective one of the distribution portions and for distributing the flow of fuel to the fuel cell stacks through the second distribution portions;
    a supply tube for supplying the flow of fuel; and
    a fuel distributor as in the fuel distributor of claim 1, the plurality of fuel cell modules equating to the corresponding plurality of fuel cell stacks or fuel cell modules of claim 1, the fuel distributor being connected to the supply tube and to the distribution portions, the fuel distributor being for receiving the flow of fuel through the supply tube and for distributing the flow of fuel to the fuel cell modules through the distribution portions.

11. A fuel cell module comprising:
a plurality of fuel cell stacks connected to a corresponding plurality of distribution portions, each of the distribution portions for distributing a flow of fuel to a respective one of the fuel cell stacks;
a supply tube for supplying the flow of fuel; and
a fuel distributor as in the fuel distributor of claim 1, the plurality of fuel cell stacks equating to the corresponding plurality of fuel cell stacks or fuel cell modules of claim 1, the fuel distributor being connected to the supply tube and to the distribution portions, the fuel distributor being for receiving the flow of fuel through the supply tube and for distributing the flow of fuel to the fuel cell stacks through the distribution portions.

12. The fuel cell module of claim 11, wherein each of the distribution portions has a same length.

* * * * *